(12) United States Patent
Klinnert et al.

(10) Patent No.: US 7,123,545 B2
(45) Date of Patent: Oct. 17, 2006

(54) MONITORING DEVICE AND METHOD USING ECHO SIGNALS

(75) Inventors: Roland Klinnert, Korntal-Muenchingen (DE); Christian Zott, Bietigheim-Bissingen (DE); Hauke Schmidt, Palo Alto, CA (US); Steffen Schluff, Mannheim (DE); Bernhard Wirnitzer, Hemsbach (DE)

(73) Assignee: Robert Bosch GmbH, Stuttgart (DE)

( * ) Notice: Subject to any disclaimer, the term of this patent is extended or adjusted under 35 U.S.C. 154(b) by 227 days.

(21) Appl. No.: 10/485,494

(22) PCT Filed: Jun. 1, 2002

(86) PCT No.: PCT/DE02/02017

§ 371 (c)(1), (2), (4) Date: Aug. 20, 2004

(87) PCT Pub. No.: WO03/016941

PCT Pub. Date: Feb. 27, 2003

(65) Prior Publication Data

US 2005/0052950 A1    Mar. 10, 2005

(30) Foreign Application Priority Data

Aug. 2, 2001 (DE) ................ 101 38 001

(51) Int. Cl.
*G01S 7/52* (2006.01)
*G01S 15/87* (2006.01)

(52) U.S. Cl. ............................................. 367/99
(58) Field of Classification Search .................. 367/5, 367/99, 118
See application file for complete search history.

(56) References Cited

U.S. PATENT DOCUMENTS 6,765,491 B1 * 7/2004 Nass .................. 356/487

FOREIGN PATENT DOCUMENTS

| DE | 40 23 538 | 1/1992 |
| DE | 198 02 724 | 7/1999 |
| EP | 1 058 126 | 12/2000 |
| GB | 2 317 316 | 3/1998 |

* cited by examiner

*Primary Examiner*—Dan Pihulic
(74) *Attorney, Agent, or Firm*—Kenyon & Kenyon LLP

(57) ABSTRACT

An echo-signal monitoring device having a plurality of transceiver units for transmitting signals and receiving the echoes reflected by an external object and an analyzer unit for estimating the distance from the monitoring device to the external object on the basis of the received echoes is characterized in that the device has an operating mode for calculating the relative position of the transceiver units from one another on the basis of the reflected echoes.

15 Claims, 3 Drawing Sheets

MONITORING DEVICE AND METHOD USING ECHO SIGNALS

FIELD OF THE INVENTION

The present invention relates to a device and a method for monitoring the environment with the help of echo signals.

BACKGROUND INFORMATION

Devices and methods for monitoring the environment with the help of echo signals are used in particular in motor vehicles, where obstacles in the environment of the vehicle are detected with the help of transceiver units, in particular for ultrasound, radar, and infrared signals. A plurality of such transceiver units may be fixedly mounted on the vehicle body, and if necessary a warning signal is generated to warn the driver of the vehicle of a potentially hazardous approach to an obstacle in complex traffic situations such as parking.

Such a monitoring device and a method for operating same are referred to in DE 40 23 538 A1, for example.

The accuracy with which such devices function depends to a great extent on the accuracy with which the relative positions of the plurality of transceiver units of such a monitoring device are known in relation to one another and can be taken into account in calculating the distance from an obstacle on the basis of the received echo signals.

In particular, a rough classification of the obstacle (wall, point, inside corner, . . . ) according to the mathematical equations referred to in DE 40 23 538 A1 requires accurate knowledge of the relative positions. In addition, in the case of an obstacle at a great distance, i.e., an obstacle whose distance from the vehicle is much greater than the distances between the transceiver units, the direct echoes detected by the individual transceiver units have propagation times that differ only slightly, and these propagation times constitute a usable approximate value for the actual distance, but in the case of a near point obstacle such as a post whose distance from the vehicle is less than the distance between the transceiver units, neither a direct echo nor a cross-echo is a usable approximation for the actual distance. For example, if the vehicle is approaching a post so that it could strike the post at a point between two transceiver units, then with progressive approach to the post, the propagation time of the cross-echo reflected back from it does not approach zero but instead approaches the propagation time corresponding to the distance between the two transceiver units. The accuracy with which this latter distance is known is therefore crucial for the lower limit up to which the monitoring device is still capable of estimating a distance from an obstacle with a usable accuracy.

This problem has resulted in echo-signal monitoring devices for motor vehicles being installed so far practically only in new vehicles by vehicle manufacturers. In retrofitting a vehicle with such devices, it may be very difficult to ensure the accuracy required for reliable measurements in positioning the transceiver units. This may be the case in particular when the retrofitting is performed by the vehicle owner himself.

SUMMARY OF THE INVENTION

The exemplary embodiment and/or exemplary method of the present invention provides an echo-signal monitoring device and a method for determining the relative position of transceiver units in an echo-signal monitoring device which permit a distance measurement with a high accuracy, which is virtually independent of the precision with which the transceiver units were positioned at the time of installation.

With the exemplary embodiment and/or exemplary method of the present invention, the echo signals may be used in measuring not only the distance of the transceiver units from an obstacle in the case of a known distance between the transceiver units but also to measure their mutual spacing with the help of redundant measurements (measurement of the distances between transceiver units is also referred to below as calibration.) It is therefore sufficient if predetermined installation positions are only approximately achieved when installing the exemplary device according to the present invention. By subsequent measurement of the distances between the transceiver units and by using these measured distances in the analysis of echo propagation times measured in normal operation, an accurate determination of the distance from an obstacle may be achieved.

This property also allows for the use of the same model of the monitoring device on different types of motor vehicles having different installation positions for the transceiver units. Specific adaptation of the device to the geometric characteristics of a vehicle is performed automatically after installation.

Of course, measurement of the distances may be performed not only at the time of installation but also repeatedly at any later point in time—automatically or on input of a command by a user. For example, the device may recognize an ambient situation suitable for performing a calibration on the basis of the echo propagation times detected—by a method to be described in greater detail below—and to perform a calibration in such a situation.

To simplify the analysis of the received echo signals, the transceiver units expediently have a detection threshold which the amplitude of a received echo must exceed to be detected by the transceiver unit and which drops gradually from a high level directly after transmission of a signal by the transceiver unit to a low level. This detection threshold is defined so that it always allows reliable detection of the direct echo. This simplifies the analysis of the echo signal at the first unit. Use of the detection threshold may result in a cross-echo of a second transceiver unit which transmitted at an earlier point in time than a first transceiver unit, not being detected by the first unit. Conversely, however, the second unit detects a cross-echo signal coming from the first unit because the detection threshold used by it is lower at the time of arrival of the cross-echo than that of the first. Since the cross-echo propagation time to be measured is the same on both paths, no distance information that could be derived from the echoes is lost.

The points in time when the transceiver units each transmitting pulse-shaped signals may be determined by a control unit according to a stochastic model. This permits a simple differentiation of cross-echoes from direct echoes, so that the signals may be transmitted interlaced in time and thus multiple measurements may be performed within a short period of time.

Adaptive filters are suitable in particular for analyzing these echo signals. Their use in an echo-signal monitoring device is known from DE 198 02 724 A1.

To determine the relative position of a plurality of transceiver units of an echo-signal monitoring device, it is in principle sufficient in the case of a pair of transceiver units to measure the direct echo propagation times from a transceiver unit to a linear obstacle and back to the same transceiver unit and the cross-echo propagation time from one of the transceiver units via the obstacle back to the other transceiver unit of the pair in order to calculate the distance between the two units on the basis of the resulting propagation times.

However, to improve accuracy, it is advisable to measure the echo propagation times repeatedly and to average the results over the repeated measurements in the calculation. The echo-signal monitoring device may be moved slowly while these measurements are being performed.

To perform these calibration measurements, it is advisable to define a plurality of pairs among the multiple transceiver units of the echo-signal monitoring device and to measure the echo propagation times for this plurality of pairs. By using a sufficient number of pairs, redundant measurements may be obtained in this way, permitting a conclusion to be drawn as to the reliability of the individual measurements. Analysis of such redundant measurements may be performed using an error minimization method, in particular the least error squares method.

If an echo propagation time is measured repeatedly in succession, noise components in the received echo signal cause fluctuation of the measured echo propagation time. The greater this fluctuation, the lower the signal-to-noise ratio of the received echo signal may be assumed to be and the lower is the reliability of the measurement. Therefore, a measurement is expediently taken into account in error minimization using weighting, which is the greater the smaller the fluctuation is.

The relative positions of the transceiver units and an obstacle supplying an echo in relation to one another have an influence on the reliability with which the distance between transceiver units may be deduced from a measurement. For a given configuration of sensor systems and obstacles, a geometry quality measure may be defined, which may be used for weighting the individual measurements. The geometry quality measure is an error amplification factor, i.e., at a high geometry quality, the sensitivity of the sensor distance estimate to measurement errors is low and vice versa.

For example, the closer the obstacle is to the vehicle, i.e., the more obtuse the angle is at which it reflects a cross-echo, the greater is the influence of the distance between the transceiver units on the cross-echo propagation time. At the same time, propagation times of the cross-echoes which are much greater than those of the direct echoes are obtained in reflection on a linear obstacle in such a case. It is therefore advantageous to evaluate the reliability of a measurement of a cross-echo propagation time on the basis of its ratio to the direct echo propagation times of the transceiver units involved in measurement of the cross-echo propagation time and to take into account the measurement using a weighting which is greater as the cross-echo propagation time is longer in relation to the direct echo propagation times.

DETAILED DESCRIPTION

Figure 1:
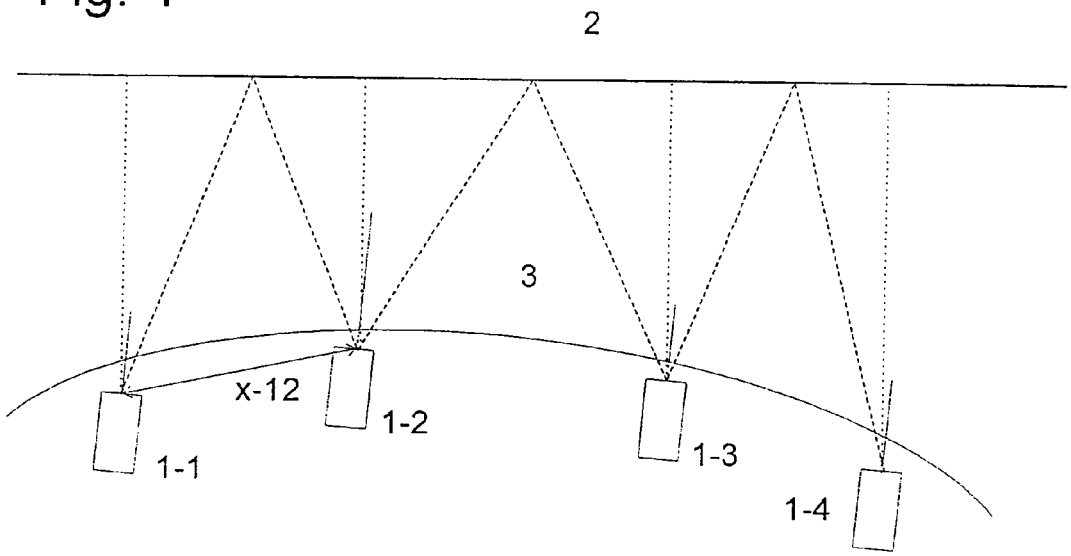
FIG. 1 shows an arrangement of four transceiver units of an echo-signal monitoring device according to the present invention in a calibration scenario.

FIG. 1 shows a system of four transceiver units $1\_1$, $1\_2$, $1\_3$ and $1\_4$ of an echo-signal monitoring device with respect to a wall 2 representing a linear obstacle to be detected with the echo-signal monitoring device. The echo-signal monitoring device is built into a motor vehicle. The curved line along which transceiver units $1\_1$ through $1\_4$ are distributed may represent, for example, the curve of a bumper 3 of the vehicle, as seen from above.

Transceiver units $1\_1$ through $1\_4$ send pulse-shaped echo signals at points in time which are determined randomly by a control unit (not shown in the figure) and these signals are reflected by wall 2. A direct echo is reflected by the corresponding points on wall 2, whose surface normal intersects one of transceiver units $1\_1$, ..., $1\_4$. Cross-echoes are reflected by points $2\_ik$ on wall 2, where the angle of incidence of a signal pulse from transceiver unit $1\_i$ is equal to the angle of reflection to unit $1\_k$. If $T\_ik$ denotes the echo propagation time from transceiver unit $1\_i$ to obstacle 2 and back to unit $1\_k$, if $x\_ik$ denotes the linear distance between units $1\_i$ and $1\_k$ and if c is the velocity of sound, then the following equation from DE 40 23 538 holds:

$$T\_ik^2 = (x\_ik/c)^2 + (T\_ii)(T\_kk) \qquad (1)$$

If the obstacle is not linear but instead is a punctiform obstacle such as a post or convex such as a circle or an edge or concave such as an inside corner, then equation (1) does not hold in general, i.e., there are only certain positions of the transceiver units for which this holds, and it cannot be satisfied simultaneously for all pairs i,k of transceiver units.

The echo-signal monitoring device has two operating modes.

A first operating mode is the so-called normal mode in which the control unit continuously determines the distance between the vehicle and obstacles in its environment on the basis of the direct echo and cross-echo propagation times measured by the transceiver units; it presupposes distances $x\_ik$ of the transceiver units as being known. This mode corresponds to the traditional operation of echo-signal monitoring devices and therefore is not described in detail here.

In addition, the ratio of the cross-echo propagation time to the direct echo propagation time may optionally also be used as the basis for classifying an obstacle detected as one of the following types: a punctiform or convex obstacle, a linear or planar obstacle (wall) or a concave obstacle. Since this classification is discussed in detail in DE 40 23 538 and is related only indirectly to the object of the present invention, it will not be discussed further here. Within the context of the present invention, an obstacle is classified as planar if the measured echo propagation times ($T\_ik$) satisfy equation (1) with a sufficient accuracy for all pairs ($1\_i$, $1\_k$) of transceiver units capable of receiving a cross-echo from one another. The definition of "sufficient accuracy" in this context will be explained in greater detail below.

The second operating mode is a so-called calibration mode. Due to a simple design according to the present invention, this mode may be initiated by a user of the device, i.e., the driver of the vehicle in which the echo signal detection device is installed, by inputting a command into the control unit. In this embodiment, it is not necessary for the echo signal detection device to be capable of classifying the obstacle detected in the manner described above.

According to another embodiment, the echo signal detecting device is capable of automatically switching to the calibration mode when the classification of a detected obstacle has shown repeatedly that it is linear and is therefore suitable for performing a calibration. As another condition, which must be met for switching to the calibration mode, the echo-signal monitoring device, i.e., the vehicle in which it is installed, may be moved at a low speed. As a result successive echo propagation time measurements in different positions of the vehicle with respect to the obstacle, so that measurement errors which occur in the individual measurements have only a weak correlation and are mutually compensated for the most part in averaging the distances x_ik of the transceiver units calculated from the measured propagation times.

In the calibration mode the transceiver units continue to emit pulses at points in time determined by the control unit, and the resulting echo propagation times are detected.

Detection of a measured value of direct or cross-echo propagation times of a pair of transceiver units is necessarily performed over a finite interval of time—first, because the signals require a certain propagation time to reach the obstacle and return back to a transceiver unit, because not all the transceiver units are able to transmit simultaneously (quasi-parallel transmission is possible only with stochastic coding and then a plurality of pulses must be correlated) because otherwise it would be impossible or at least impractical to differentiate the individual direct echos and cross-echoes during reception. However, the interval of time during which the pulses are transmitted and the particular direct echo and cross-echo propagation times are detected is so short, i.e., any movement of the vehicle itself is so slow that the movement of the vehicle itself during this interval of time does not result in any mentionable falsification of the measurement results.

To rule out the possibility of such falsification, in one embodiment of the echo-signal monitoring device a velocity signal input is provided, this value being input, e.g., on the tachometer of the vehicle, and the control unit switches to the calibration mode only when the signal applied at this input indicates a vehicle speed below a limit which has been selected as being suitable (as a function of the operating speed of the echo-signal monitoring device). As an alternative, however, the control unit may estimate the speed of the vehicle on the basis of the change in the measured echo propagation times between two measurements during normal mode and to compare the estimated speed with the limiting value to thereby ascertain whether a suitable calibration scenario exists.

While in the normal operating mode, classification of the obstacle according to one of the types indicated above may be performed on the basis of the question of whether the cross-echo propagation time satisfies equation (1), in the calibration mode it is assumed that the obstacle is linear. Under this assumption, x_ik may be calculated by substituting the echo propagation times T_ii, T_kk and T_ik (=T_ki) measured by a pair of transceiver units $1_i$ and $1_k$ into equation (1), which is solved for x_ik.

To improve on the accuracy of the calculation of x_ik, a plurality of direct echo and cross-echo propagation times is determined for each pair of transceiver units $1_i$, $1_k$, and the average value of several measurements is used as the measured value for distance x_ik.

Not all measured echo propagation times are weighted equally in averaging. Several aspects must be taken into account in the weighting. The first aspect is the geometry, which may be described with a geometry quality measure (see above). The geometry quality measure may be derived from the instantaneous position estimates, the instantaneous distance measurements and the covariance matrix of the distance measurements. Thus an increased accuracy of the sensor position estimate is achieved by tracking the expected accuracy of the estimate (geometry quality) in ongoing calibration for weighting the individual measurements. For example, if the propagation time of the cross-echo is only insignificantly greater than that of the two direct echoes or if it is between the two, then this means that the cross-echo has been reflected at a small angle on the obstacle. The propagation time then depends only slightly on distance x_ik, so that any errors in the measurement of the propagation time will have a great effect on distance x_ik calculated from such a measurement. However, if the propagation time of the cross-echo is significantly greater than that of the direct echo, then the angle of reflection on the obstacle is great and the influence of a measurement error in measurement of T_ik on distance x_ik calculated from such a measurement is low. In addition, there are the influences of the beam characteristic of the transceiver units: transmission and reception efficiency of the transceiver units are inferior at large emission and reception angles to those at small angles, so that in the former case the amplitude of the received echo signal is low despite the short propagation time. How great the decline in transmission and reception efficiency will be at large angles will depend on the design of the transceiver units. From the totality of these influences, a weighting function which depends on the direct echo and cross-echo propagation times may be formulated in advance, and this weighting function is stored fixedly in the control unit in the form of an executable program code or a table, and for a combination of propagation times, the weight with which distance x_ik calculated therefrom enters into the calculation of the average.

As indicated above, the echo monitoring device according to the present invention may have the ability to sort obstacles detected by it according to their shape into a plurality of classes and thereby automatically recognize a straight wall suitable for performing a calibration. This finding presupposes that in order to be able to use equation (1), the device has an initial estimate $x_0\_ik$ for x_ik and an estimate e of the possible deviation of this initial value from the actual distance value. The control unit then recognizes an obstacle as being straight and suitable for performing a calibration when equation (1) is met within the limits of deviation e:

$$((x\_ik - e)/c)^2 + (T\_ii)(T\_kk) < \qquad (2)$$
$$T\_ik^2 < ((x\_ik + e)/c)^2 + (T\_ii)(T\_kk).$$

After a calibration has been performed on the basis of this obstacle, the control unit replaces initial estimate $x_0\_ik$ by average x_ik obtained from the calibration and replaces accuracy e with the standard deviation of mean x_ik or a comparable variable representing a measure of the possible deviation between measured value x_ik and the actual distance between transceiver units $1_i$ and $1_k$. Finally, distance x_ik may be detected with high accuracy by repeated calibration using deviation e, which decreases from one time to the next.

The method described above is performed in a calibration for all possible pairs of transceiver units of the echo-signal monitoring device which are capable of receiving cross-echoes from one another.

If the cross-echo monitoring device includes n transceiver units, they may be combined to form a total of $n(-1)/2$ pairs. If each transceiver unit of these pairs is capable of receiving a cross-echo from the other unit of the pair, then a total of n(−1)/2 measured distance values are obtained. As soon as n is greater than 4, the number of measured values is greater than the number of degrees of freedom in the system of units. In such a case, the actual distances between units is calculated from the particular measured values by adjusting with the least error squares. Such methods, which are also referred to as least square fits, are available for processing measurement data and therefore need not be discussed separately here.

As this readily shows, the applicability of the method described above is in principle independent of the manner in which the transmission points in time of the individual transceiver units are determined. They may therefore be operated by the time multiplex method, so that after a pulse has been sent out, a second transceiver unit does not send out another pulse before the arrival of direct echoes and cross-echoes from the first transceiver unit. Although the echo signals are relatively easy to analyze in this time multiplex control method because it is always unambiguously certain to which transmission pulse a detected echo is to be assigned, it has the disadvantage that long measurement times are required. Therefore, it is impossible or at least impractical in general to implement a classification of obstacles detected and thus an automatic transition to the calibration mode using time multiplex control. However, even using time multiplex control, the calibration may be performed by placing the vehicle in a plurality of positions in front of a wall after installation of the echo-signal monitoring device and by measurements of the echo propagation times in the various positions being triggered manually.

Figure 2:
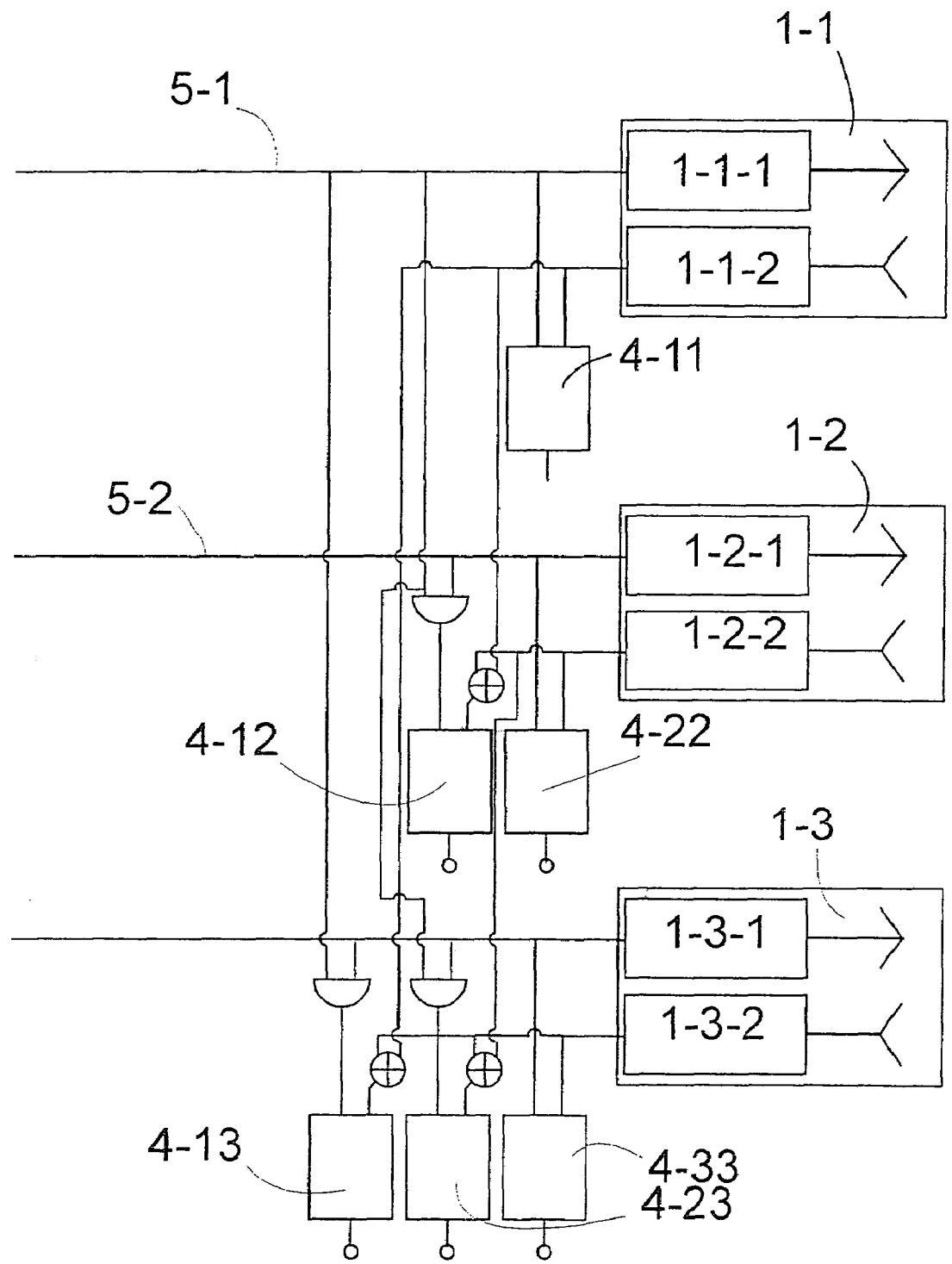
FIG. 2 shows a detail of a circuit system for analysis of the echo signals detected by the transceiver units.

However, a stochastic control of the transmission points in time of the individual transceiver units by a control unit is more advantageous. FIG. 2 shows a circuit system for analysis of the echo signals obtained by such a control. This figure shows three of the transceiver units, namely 1_1, 1_2 and 1_3, each subdivided into a transmission unit 1_i_1 and a reception unit 1_i_2, i=1, 2, 3. Each transmission unit receives a trigger signal from the control unit via an input line 5_i, prompting it to send a pulse. The same trigger signal is also received by a trigger input of an adaptive filter 4_ii whose signal input is connected to a signal output of reception unit 1_i_2. The echo to the pulse transmitted is received by reception unit 1_i_2 with time lag T_ii, which changes only slowly when the vehicle is moving slowly, so that the filter characteristic of the adaptive filter is able to adapt to this time lag, and the direct echo of transceiver unit 1_i is able to be extracted from the output signal of the reception unit with a high reliability even if cross-echoes from other transceiver units are contained therein at randomly distributed points in time.

Additional adaptive filters 4_ik, where i≠k, have a signal input connected via a summing element to the outputs of reception units 1_i_2, 1_k_2 and a trigger input connected to trigger signals 5_i, 5_k via an OR gate. The filters are triggered by transmission of a pulse by transmission unit 1_i_1 or 1_k_1 and detection of the propagation time of the cross-echo from transmission unit 1_i_1 to reception unit 1_k_2 or from 1_k_2 to 1_i_2. Since the two cross-echo propagation times are the same, one filter is sufficient for detecting them, so that the system requires a total of n(n+1)/2 adaptive filters when n is the number of transceiver units.

Since the energy of a pulse returning to a receiver unit after being reflected on an obstacle is the lower, the greater the distance from the obstacle, then according to a refined embodiment, the receiver units are equipped with a detection threshold which is variable over time and suppresses in the output signal of the reception units signal contributions of an intensity below this threshold. This threshold has its highest value immediately after transmission of a sound pulse by the transmission unit of the particular transceiver unit and then its value decreases continuously. This ensures that shortly after transmission of the pulse, the only signals detected by the reception unit and output are those whose intensity indicates that they could be an echo of the pulse, while on the other hand, echo pulses of obstacles at a greater distance are still detected reliably.

If the transmission points in time of the individual transceiver units, which are randomly selected by the control unit, are completely uncorrelated, use of the variable detection threshold may result in the transceiver unit having the most recent transmission suppressing the cross-echo which is attributed to the pulse of the unit transmitting first because of the initially high detection threshold when the transmission points in time of two transceiver units are far apart. However, this problem is avoidable due to the fact that the control unit does not determine the transmission points in time of the individual transceiver units in a completely uncorrelated manner, but instead transmission points in time that are close in time are assigned to pairs of transceiver units whose distance may be measured (e.g., because the known measured value of the distance has a relatively high uncertainty e in comparison with the distances of other pairs) so that both cross-echoes having sufficient intensity to overcome the detection threshold are received.

Figure 3:
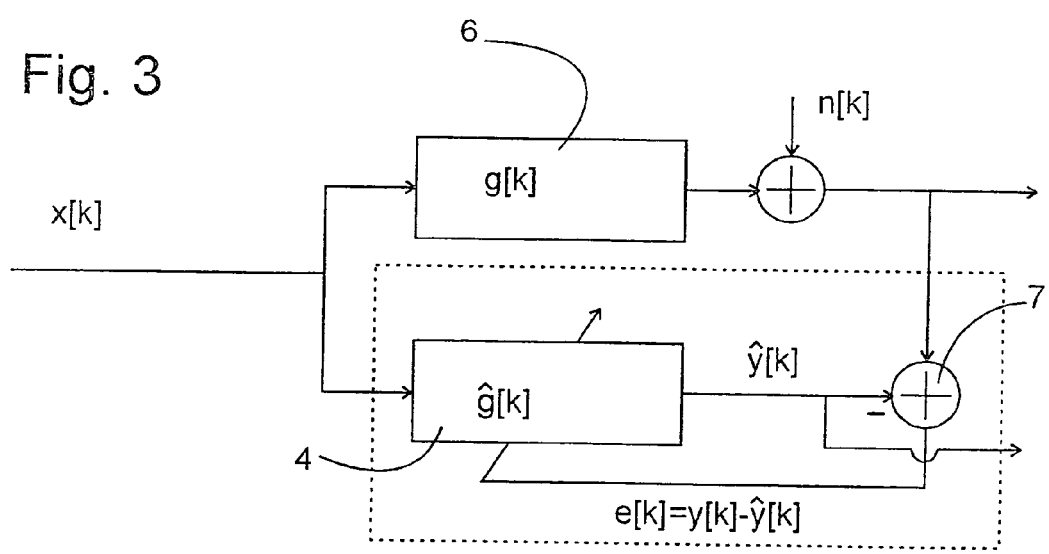
FIG. 3 shows a block diagram of an adaptive filter.

FIG. 3 shows a basic diagram of an adaptive filter 4. An input signal x[k] is sent to an unknown system 6 whose behavior is to be reproduced with adaptive filter 4 and the input signal is also sent to a trigger input of filter 4. Unknown system 6 has a pulse response g[k]. Filter 4 adapts its coefficients automatically in an available manner so that pulse response ĝ[k] of filter 4 approaches pulse response g[k] of system 6 step by step in the course of several working cycles of filter 4. To this end, the output signal of filter 4 is fed back to a correction input of filter 4 via an adder 7, which forms sum e[k] of output ŷ[k] (with inverted sign) of filter 4 and response y[k] of the unknown system, which is superimposed on interference (noise) n[k], and the coefficients are adapted step by step as a function of e[k]. Sum e[k] thus to a certain extent represents the adaptation error of the adaptive filter. The propagation time of the echo signal to be detected by the filter may be read from pulse response ĝ[k] (i.e., the totality of coefficients set on filter 4).

Figure 4:
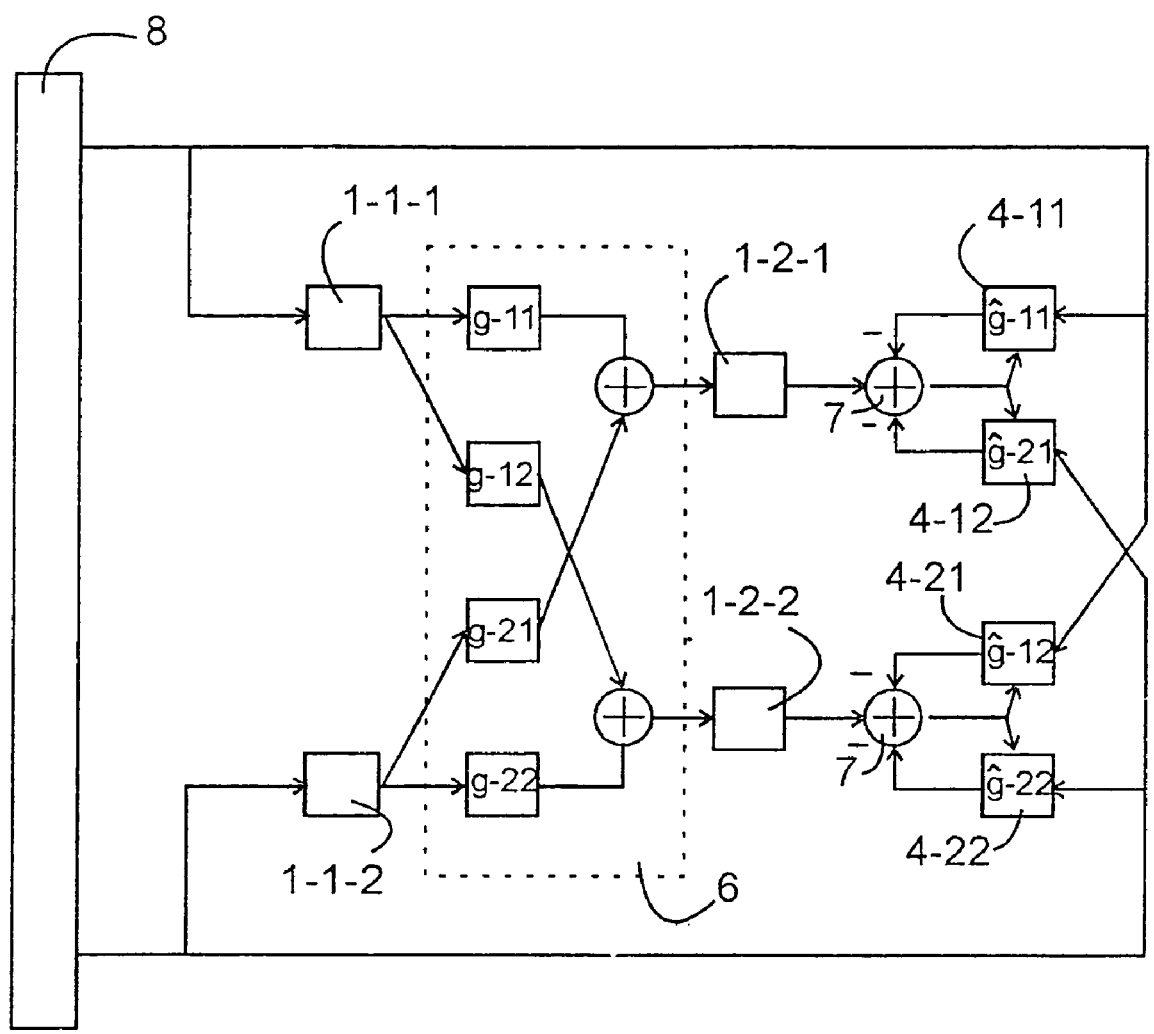
FIG. 4 shows a diagram of signal processing in the echo-signal monitoring device according to the present invention.

FIG. 4 illustrates the principle of signal processing in an echo-signal monitoring device according to the present invention, equipped with adaptive filters.

As mentioned above, control unit 8 in FIG. 4 prompts transmission units 1_1_1 and 1_1_2 to transmit signal pulses at stochastically defined points in time. These pulses strike obstacles in the environment of the monitoring device and are reflected by them. Reflected echo signals are superimposed at reception units 1_2_1 and/or 1_2_2 with a time offset which is determined by the particular transmission points in time. The echo signals received by the reception units are obtained from the pulses emitted by the transmission units as indicated in FIG. 4 by a broken-line rectangle 6 having four filters with response functions g_ij, i, j=1, 2, each of which describes the response of the environment to a pulse emitted by transmission unit 1_1_i, and received at reception unit 1_2_j; it also has two adders which represent the superimposition of direct echoes and cross-echoes to form the reception signal of each reception unit.

An output of control unit 8 which supplies a pulse to transmission unit 1_1_i is at the same time connected to trigger inputs of adaptive filters 4_ij whose pulse responses $\hat{g}\_ij$ each approximate pulse responses $g\_ij$ of the environment. The output signals of adaptive filters 4_11, 4_12 are superimposed on the reception signal of reception unit 1_2_1 with inverted sign in an adder 7; the difference between the reception signal and the sum of signals approximated by filters 4_11, 4_12 is in turn used to control the coefficients of the filter. Although a plurality of adaptive filters is adapted via the output signal of a single reception unit 1_2_i, the coefficients of the filters converge rapidly toward a stable state.

From the trend in the coefficients of individual filters 4_ij over time, control unit 8 is able to determine the speeds at which an obstacle responsible for a certain contribution to the received echo signal is moving in relation to the monitoring device. To additionally accelerate the convergence of the filters, a control unit 8 may be provided to calculate a set of coefficients expected at a given point in time in the future on the basis of a current set of coefficients of each filter 4_ij and to use this set of coefficients at that particular point in time on particular filter 4_ij. It is assumed that such an extrapolated set of coefficients at the particular future point in time will yield a better approximation $\hat{g}\_ij$ of the then valid response function $g\_ij$ of environment 6 than would a set of coefficients that has remained unchanged, so that a usable adaptation of approximated pulse response $\hat{g}\_ij$ to actual pulse response $g\_ij$ at the future point in time is achievable with a reduced number of measurement cycles and consequently in a shorter period of time than would be the case if the extrapolation were not performed.

The invention claimed is:

1. An echo-signal monitoring device comprising:
   transceiver units, each for transmitting a signal and receiving an echo reflected back by an external object; and
   an analyzer unit for estimating a distance from the monitoring device to the external object based on received echoes;
   wherein the monitoring device includes an operating mode for calculating a relative position of the transceiver units to one another based on a reflected echo.

2. The echo-signal monitoring device of claim 1, wherein the monitoring device checks whether propagation times of the received echoes meet predetermined conditions, and if so, the monitoring device switches to the operating mode for calculating the relative position of the transceiver units to one another.

3. The echo-signal monitoring device of claim 2, wherein the monitoring device includes a signal input for a speed signal and it switches to the operating mode for calculating the relative position of the transceiver units to one another only when the speed signal applied to the signal input indicates a speed below a predetermined limiting value.

4. The echo-signal monitoring device of claim 2, wherein the monitoring device is operable to estimate a speed of the external object associated with the echoes based on a change in the propagation times of successively received echoes over time, and it switches to the operating mode for calculating the relative position of the transceiver units to one another only when the estimated speed is below a predetermined limiting value.

5. The echo-signal monitoring device of claim 1, wherein the each of the transceiver units include a detection threshold which an amplitude of a received signal must exceed to be detected by the transceiver units, the detection threshold dropping gradually from a high value to a low value immediately after transmission of the signal by a corresponding one of the transceiver units.

6. The echo-signal monitoring device of claim 1, further comprising:
   a control unit to determine points in time for transmitting a pulse-shaped signal for the transceiver units according to a stochastic model.

7. The echo-signal monitoring device of claim 1, further comprising:
   adaptive filters for the transceiver units.

8. A method for determining a relative position of transceiver units of an echo-signal monitoring device, the method comprising:
   measuring direct echo propagation times from a pair of the transceiver units and back to the same transceiver units and a cross-echo propagation time from one of the transceiver units to another one of the transceiver units of the pair being measured for at least one pair of the transceiver units, the distance being determined based on measured direct echo propagation times.

9. The method of claim 8, wherein the direct echo propagation times are measured repeatedly and calculation of a distance includes averaging over repeated ones of the measured times.

10. The method of claim 9, wherein a geometry quality measure is determined based on the measurements, and is used to increase an accuracy of an estimate of a sensor position.

11. The method of claim 9, wherein the repeated ones of the measurements are performed during a movement of the echo-signal monitoring device.

12. The method of claim 8, wherein the direct echo propagation times are measured for a plurality of pairs of the transceiver units.

13. The method of claim 12, wherein the plurality of pairs is selected so that redundant measurements are performed, and positions of the transceiver units are obtained from the redundant measurements with an error minimization process.

14. The method of claim 13, wherein a reliability of a measurement of an echo propagation time is evaluated based on a fluctuation in the measured echo propagation time in the repeated measurements, and the measurement is considered in the error minimization process using a weighting that is greater the smaller the fluctuation.

15. The method of claim 13, wherein a reliability of a measurement of a cross-echo propagation time is evaluated based on its relationship to the direct echo propagation times of the transceiver units involved in the measurement of the cross-echo propagation time, the measurement being considered in the error minimization process using a weighting that is greater the longer the cross-echo propagation time is in relation to the direct echo propagation times.

* * * * *